United States Patent [19]

Nishida

[11] Patent Number: 5,619,697

[45] Date of Patent: Apr. 8, 1997

[54] INTER-PROCESSOR COMMUNICATION SYSTEM FOR PERFORMING MESSAGE COMMUNICATION BETWEEN PROCESSORS AND MULTI-PROCESSOR REAL TIME SYSTEM FOR COMMUNICATING AMOUNG A PLURALITY OF PROCESSORS AT REAL TIME WITH THE INTER-PROCESSOR COMMUNICATION SYSTEM

[75] Inventor: Moritugu Nishida, Fukuoka, Japan

[73] Assignee: Matsushita Electric Industrial Co., Ltd., Japan

[21] Appl. No.: 589,415

[22] Filed: Jan. 22, 1996

Related U.S. Application Data

[63] Continuation of Ser. No. 195,013, Feb. 14, 1994, abandoned.

[30] Foreign Application Priority Data

Feb. 17, 1993 [JP] Japan .................................. 5-049906

[51] Int. Cl.[6] .......................................... G06F 9/00
[52] U.S. Cl. .................................... 395/680; 395/800
[58] Field of Search .............................. 395/450, 800

[56] References Cited

U.S. PATENT DOCUMENTS

| | | | |
|---|---|---|---|
| 5,050,066 | 9/1991 | Myers et al. ................ | 395/375 |
| 5,195,089 | 3/1993 | Sindhu et al. ............... | 395/375 |
| 5,287,453 | 2/1994 | Roberts ....................... | 395/200 |
| 5,335,347 | 8/1994 | Foss et al. ................... | 395/650 |
| 5,367,673 | 11/1994 | Goldsmith et al. .......... | 595/600 |
| 5,367,681 | 11/1994 | Foss et al. ................... | 395/650 |

Primary Examiner—Jack B. Harvey
Assistant Examiner—David A. Wiley
Attorney, Agent, or Firm—Rossi & Associates

[57] ABSTRACT

An inter-processor communication system is composed of a first processor functioning as a client, a second processor 33 functioning as a server and an inter-processor communicator through which various types of messages such as an indication type, a request type and a response type to perform a message communication. The first processor has a client executer for sequentially sending a plurality of request type of client messages, a server message receiving and classifyer for classifying a plurality of response type of server messages and an indication or request type message sent form the second processor, an indication/request type message mail box for storing the indication or request type message, and a response type message mail box for storing the server messages. The second processor has a client message receiving and classifyer for classifying the client messages, an indication/request message mail box for storing the client messages, and a server executer for performing a plurality of services requested by the client according to the client messages and generating the server messages. The server messages are sequentially processed in the client executer.

8 Claims, 8 Drawing Sheets

A SENDING FORMAT OF A MESSAGE

INTER-PROCESSOR COMMUNICATION SYSTEM FOR PERFORMING MESSAGE COMMUNICATION BETWEEN PROCESSORS AND MULTI-PROCESSOR REAL TIME SYSTEM FOR COMMUNICATING AMOUNG A PLURALITY OF PROCESSORS AT REAL TIME WITH THE INTER-PROCESSOR COMMUNICATION SYSTEM

This is a Continuation of application Ser. No. 08/195,013 filed Feb. 14, 1994, now abandoned.

BACKGROUND OF THE INVENTION

1. Field of the Invention

The present invention relates generally to an inter-processor communication system in which an event occurring by detecting, for example, a piece of input data is processed in coaction of a pair of processors respectively having a particular event processing function for processing the event, and more particularly to an inter-processor communication system in which processed results of events are sequentially transmitted from an executed processor to a requesting processor through a message communication means while synchronizing the processing of the events and the transmission of the processed results in the processors at real time. Also, the present invention relates generally to a multi-processor real time system in which a plurality of events are sequentially processed at real time among a plurality of processors while controlling the execution and halt of event processing programs executed in executed processors, and more particularly to a multi-processor real time system in which a plurality of events are sequentially processed at real time among a plurality of processors according to a request and response type communication by the application of the inter-processor communication system.

2. Description of the Related Art

A plurality of events are conventionally processed one after another by executing various event processing programs stored in a single processor such as a micro processor according to a centralized control method. However, because a processor technique has been recently developed, a plurality of events are processed by executing various event processing programs stored in a plurality of processors of a multi-processor system according to a distributed processing method. Therefore, the processing performance such as load distribution and trouble resistance is enhanced by the application of the multi-processor system because the processing of the events are shared among the processors.

The multi-processor system is generally composed of a plurality of servers and a client. Each of the servers is defined as a comparatively small scale processing program and a particular circuit performing a single particular function which is operated by the execution of the processing program. For example, an external storing device or a printer is operated by executing a processing program of a server. Also, the client is defined as a comparatively large scale processing program to perform a high-level function while utilizing one or more processed results obtained in the servers. Therefore, a complicated control is required to execute the processing program of the client.

The concept of the multi-processor system having the servers and the client has generally no direct relation to the number of processors. Therefore, the multi-processor system is not required to have a plurality of processors. The number of processors in the multi-processor system is mostly determined according to the scale of functions required of the multi-processor system. However, though an event is sometimes processed in a single processor, the event is usually processed in coaction of a plurality of processors because a load distribution and a function distribution are considered. Therefore, the client and the servers are respectively placed in a processor.

In cases where an event is processed in the client while utilizing a result of the event processed in one or more servers, procedures for utilizing functions of the servers in the client become the same regardless of the number of processors in which the processing program of the client and the processing programs of the servers are executed on condition that calling programs utilized for calling the servers are programmed in the same type as a subroutine call included in the processing program of the client. Therefore, even though the number of processors is required to be changed because the size of the multi-processor system is altered, the alteration of the client itself is not required. That is, the configurations of the processors can be easily altered without alterring the client.

Therefore, in cases where the client and a server are operated in a plurality of processors, a subroutine call is executed by the client to utilize the function of the server as a service. Thereafter, a request message is sent from the client to the server to request the service of the server, and the client is set to a ready state. Thereafter, the service is executed and completed in the server. Thereafter, a response is sent from the server to the client to inform the completion of the service, and the completion of the service executed in the server is confirmed in the client. Therefore, the client is again set to an operating state to process an event processed in the server. The conventional procedure described above is called a request and response type inter-processor communication method.

2.1. Previously Proposed Art

The inter-processor communication method conventionally performed is described in detail with reference to FIG. 1.

FIG. 1 is a functional block diagram of a conventional multi-processor real time system in which a request and response type procedure is performed among three processors according to the inter-processor communication method.

As shown in FIG. 1, a conventional multi-processor real time system 11 is composed of a first processor 12 functioning as a first task executing means to execute a processing program of a client, a second processor 13 functioning as a second task executing means to execute a processing program of a first server, a third processor 14 functioning as a third task executing means to execute a processing program of a second server, and an inter-processor communication means 15 through which messages such as an indication message, a request message and a response message are transferred to perform a message communication among the processors 12, 13 and 14.

The first processor 12 is composed of a client executing means 16 for executing the client as the first task executing means, a client mail box means 17 at which a message addressed to the client executing means 16 is mailed to execute the means 16, a received message distribution means 18 for selectively receiving messages addressed to the processor 12, classifying the messages into a type of indication message, a type of request message and a type of response message, and mailing the messages at corresponding regions of the client mail box means 17 according to the types of the messages classified, a task halting means 19 for halting the execution of the client executing means 16 until a response message is sent from the client mail box means 17 to the client executing means 16, and a task restarting means 20 for restarting the execution of the client executing means 16 when the response message sent from the first or second server is received in the received message distribution means 18.

The second processor 13 is composed of a server executing means 21 for executing the first server as the second task executing means, a server mail box means 22 at which a message addressed to the server executing means 21 is mailed to execute the means 21, and a received message distribution means 23 for selectively receiving messages addressed to the processor 13, classifying the messages into a type of indication message, a type of response message and a type of request message, and mailing the messages at corresponding regions of the server mail box means 22 according to the types of the messages classified. The third processor 14 is composed of a server executing means 24, a server mail box means 25 and a received message distribution means 26 in the same manner as the second processor 13.

A conventional inter-processor communication system is composed of the first processor 12, the second or third processor 13 or 14 and the inter-processor communication means 15.

In the above configuration, a request message is sent from the client executing means 16 to the server executing means 21 or 24 to start the operation for processing an event in the means 21 or 24, and a response message is sent from the server executing means 21 or 24 to the client executing means 16. The operation for processing the event in the client executing means 16 is halted until the response message is received in the means 16.

In detail, a request type of client message is sent from the client executing means 16 to the second processor 13 through the inter-processor communication means 15 to request a service for processing an event. At this time, a reading operation of the client executing means 16 for reading a message from the client mail box means 17 is stopped by the function of the task halting means 19.

Thereafter, the request type of client message addressed to the second processor 13 is received in the message distribution means 23 and is classified. Thereafter, the request type of client message classified is mailed at the server mail box means 22. When the request type of client message is mailed at the means 22, the operation of the server executing means 21 is started, and the service requested by the request type of client message is performed. That is, the event is processed. After the service is completed, a response type of server message denoting a processed result of the event is directly sent from the server executing means 21 to the received message distribution means 18 of the first processor 12 through the inter-processor communication means 15. Also, an indication type of server massage or a request type of server message is sometimes sent from the server executing means 21 to the received message distribution means 18 regardless of the service.

When the server message is sent to the received message distribution means 18, the operation of the means 18 is started. That is, the server message is confirmed to be addressed to the client executing means 16, and the type of the server message is confirmed. Thereafter, in cases where the server message is a response type, the server message is stored at a head region of the client mail box means 17 pointed by a head pointer 17a to process the response type of server message in the client executing means 16 prior to other indication or request type of server messages stored in the client mail box means 17. In contrast, in cases where the server message is an indication or request type, the indication or request type of server message is stored at a tail region of the client mail box means 17 to process the indication or request type of server message in the client executing means 16 subsequent to other messages stored in the client mail box means 17.

Also, when the server message is sent to the received message distribution means 18, the operation of the task restarting means 20 is started by the function of the means 18. Therefore, a task restarting instruction is sent from the task restarting means 20 to the client executing means 16 of which the reading operation is stopped, so that the means 16 is informed to restart the reading operation. Thereafter, because the reading operation of the client executing means 16 is restarted, the response message stored at the head region of the client mailed box means 17 is read by the means 16. Therefore, the completion of the service requested to the second processor 13 is immediately confirmed, and the response message is processed in the client executing means 16. Thereafter, the other messages subsequent to the response message are read from the client mailed box means 17 one after another, and the other messages are processed.

In the procedure described above, the processing of the event is performed between the first and second processors 12, 13. However, the processing of the event is performed between the first and third processors 12, 14 in the same manner. In this case, the request message sent from the client executing means 16 is addressed to the third processor 14.

Accordingly, even though three types of messages are sent among the processors 12 to 14 through the inner-processor communication means 15, the response message returned from the processor 13 or 14 can be immediately received and processed in the client executing means 16 of the first processor 12 at a top priority.

2.2. Problems to be Solved by the Invention

In cases where a plurality of request messages are sent from the client executing means 16 to the second (or third) processor 13 (or 14) one after another to request a plurality of services, a first task restarting instruction is sent to the client executing means 16 when a first response message is received in the received message distribution means 18, and the operation of the client executing means 16 is restarted to perform a first processing of the first response message. Thereafter, when a second response message is received in the received message distribution means 18, a second task restarting instruction is sent to the client executing means 16, and the operation of the client executing means 16 is again restarted to perform a second processing of the second response message.

However, in cases where the second response message is received in the received message distribution means 18 during the first processing performed in the client executing means 16, the second task restarting instruction is disregarded by the means 16. Therefore, even though the client executing means 16 is set to a waiting state to receive the second task restarting instruction after the first processing is completed in the means 16, the operation of the client executing means 16 is not again restarted to perform the second processing because any more task restarting instruction is not sent to the client executing means 16.

Accordingly, there is a drawback that the second processing relating to the second response message cannot be performed. In other words, a plurality of services cannot be successively performed according to a request and response type inter-processor communication method in which a server requested a service by a client responds the service to the client. For example, even though a plurality of request and response type procedures are successively required for the confirmation of a series of initialization operations, the confirmation of the initialization operations cannot be successively performed, so that the request and response type inter-processor communication method cannot be sufficiently performed in the conventional multi-processor real time system 11 or the conventional inter-processor communication system.

SUMMARY OF THE INVENTION

A first object of the present invention is to provide, with due consideration to the drawbacks of such a conventional inter-processor communication system, an inter-processor communication system in which a plurality of response messages informing results of a plurality of services for processing a plurality of events are sequentially received and processed in a client even though a server is sequentially requested to perform the services according to a request and response type inter-processor communication method.

A second object of the present invention is to provide a multi-processor real time system in which a plurality of response messages informing results of a plurality of services for processing a plurality of events are sequentially received and processed in a client to perform a request and response type communication processing by the application of the inter-processor communication system even though a plurality of servers are sequentially requested to perform the services.

The first object is achieved by the provision of an inter-processor communication system for processing a plurality of events in coaction of a first processor and a second processor, comprising:

client executing means placed in the first processor for sending a plurality of request type of client messages to the second processor in sequence to request a plurality of services for processing a plurality of events;

client message receiving and classifying means placed in the second processor for receiving the client messages sent from the client executing means and classifying the client messages as a request type;

request type message mail box means placed in the second processor for storing the client messages classified in the client message receiving and classifying means;

server executing means placed in the second processor for performing the services requested by the client executing means in sequence according to the client messages stored in the request type message mail box means and sequentially generating a plurality of response type of server messages which denote results of the services;

inter-processor communication means placed between the first and second processors for performing a first message communication in which the client messages are sent from the client executing means to the client message receiving and classifying means and a second message communication in which the server messages are sent from the server executing means to the first processor;

server message receiving and classifying means placed in the first processor for sequentially receiving the server messages sent from the server executing means through the inter-processor communication means and classifying the server messages as a response type; and response type message mail box means placed in the first processor for sequentially storing the server messages classified in the server message receiving and classifying means and causing the operation of the client executing means, the server messages being sequentially read out from the response type message mail box means to the client executing means by the operation of the client executing means to sequentially process the server messages in the client executing means.

In the above configuration, in cases where it is judged in the client executing means that a plurality of services for processing a plurality of events are required of the second processor, a plurality of request type of client messages are sequentially sent from the client executing means of the first processor to the second processor through the inter-processor communication means to request the services of the second processor. The client messages are received and classified in the client message receiving and classifying means as a request type. Thereafter, the client message classified as a request type are stored in the request type message mail box means. Thereafter, the services requested by the client executing means are sequentially performed in the server executing means according to the client messages stored in the mail box means. After the services are accomplished, a plurality of response type of server messages denoting results of the services are sequentially generated and sent to the server message receiving and classifying means of the first processor through the inter-processor communication means. In the classifying means, the server messages are classified as a response type. Therefore, the server messages are sequentially stored in the response type message mail box means, and the operation of the client executing means is caused by the mail box means each time a server message is stored in the mail box means. Therefore, each of the server messages is sent to the client executing means, and the server messages are sequentially processed in the client executing means.

Accordingly, because the server messages are sequentially stored in the response type message mail box means and because the operation of the client executing means is caused each time a server message is stored in the response type message mail box means, all of the server messages can be reliably processed in the client executing means. In other words, in cases where the processing of a first server message is not completed in the client executing means when a second server message subsequent to the first server message is mailed at the response type message mail box means, the processing of the second server message in the client executing means is waited until the processing of the first server message is completed. Therefore, even though the server messages are sent to the first processor in a short time, all of the server messages can be reliably processed in the client executing means.

It is preferred that the inter-processor communication system additionally include indication/request type message mail box means placed in the first processor for storing an indication type message or a request type message which is generated in the server executing means independent of the client messages and is classified as an indication type or a request type in the server message receiving and classifying means and causing the operation of the client executing means, the indication type message or the request type message stored in the indication/request type message mail box means being read out to the client executing means by the operation of the client executing means to process the indication type message or the request type message after all of the server messages are read out to the client executing means.

In the above configuration, even though not only response type of server messages but also an indication or request type message are sent from the server executing means of the second processor to the first processor, the server messages can be immediately processed in the client executing means because the processing of the server messages has priority over the processing of the indication or request type message.

The second object is achieved by the provision of a multi-processor real time system for processing a plurality of events in coaction of a first processor, a second processor and a third processor, comprising:

client executing means placed in the first processor for sequentially sending a first client message to the second processor to request a first services for processing a first event and a second client message to the third processor to request a second services for processing a second event;

first client message receiving and classifying means placed in the second processor for receiving the first client message sent from the client executing means and classifying the first client message as a request type;

first request type message mail box means placed in the second processor for storing the first client message classified in the first client message receiving and classifying means;

first server executing means placed in the second processor for performing the first service requested by the client executing means according to the first client message stored in the first request type message mail box means and generating a first server message which denotes a result of the first service;

second client message receiving and classifying means placed in the third processor for receiving the second client message sent from the client executing means and classifying the second client message as a request type;

second request type message mail box means placed in the third processor for storing the second client message classified in the second client message receiving and classifying means;

second server executing means placed in the third processor for performing the second service requested by the client executing means according to the second client message stored in the second request type message mail box means and generating a second server message which denotes a result of the second service;

inter-processor communication means for performing a first message communication in which the first client message and the first server message are transferred between the first and second processors and a second message communication in which the second client message and the second server message are transferred between the first and third processors;

server message receiving and classifying means placed in the first processor for sequentially receiving the first server message sent from the first server executing means and the second server message sent from the second server executing means through the inter-processor communication means and classifying the first and second server messages as a response type; and response type message mail box means placed in the first processor for sequentially storing the first and second server messages classified in the server message receiving and classifying means and causing the operation of the client executing means, the first and second server messages being sequentially read out from the response type message mail box means to the client executing means by the operation of the client executing means to sequentially process the first and second server messages in the client executing means.

In the above configuration, a first service for processing a first event is performed in the second processor, and a first server message sent from the second processor is processed in the client executing means of the first processor in the same manner as in the inter-processor communication system composed of the first and second processors and the inter-processor communication means.

Also, a second service for processing a second event is performed in the third processor, and a second server message sent from the third processor is processed in the client executing means of the first processor in the same manner as in the inter-processor communication system composed of the first and third processors and the inter-processor communication means.

Accordingly, because the response type message mail box means is provided in place of the task halting means and the task restarting means conventionally utilized, a plurality of services can be sequentially completed in coaction of the first to third processors even though the services are requested of the second and third processors. That is, because the operation of the executing means is caused each time a server message is stored in the response type message mail box means, a plurality of services can be sequentially sent to the second and third processors, and the services can be performed in the second and third processors. Therefore, the performance of the service processing can be enhanced in the multi-processor real time system.

Also, because a plurality of services can be shared among a plurality of processors, a processing time of the services can be shortened. In other words, the performance of the service processing can be enhanced in the multi-processor real time system.

The second object is also achieved by the provision of a multi-processor real time system, comprising a plurality of processors for sequentially processing a plurality of events in coaction of the processors; and an inter-processor communication means for transferring various messages from one processor to another processor, each of the processors comprising task executing means for sequentially sending a plurality of request type of first client messages to one or more other processors Ps functioning as servers to request first services for processing a plurality of first events, performing one or more second services requested by a processor Pc functioning as a client, generating one or more response type of second server messages which denote results of the second services requested by the processor Pc functioning as a client, and sending the second server messages to the processor Pc functioning as a client through the inter-processor communication means, message receiving and classifying means for receiving a plurality of response type of first server messages sent from the task executing means of the processors Ps functioning as servers, classifying the first server mesages as a response type, receiving one or more rquest type of second client messages sent from the task executing means of the processor Pc functioning as a client, and classifying the second client messages as a request type, response type message mail box means for storing the first server messages classified in the message receiving and classifying means as a response type and causing the operation of the task executing means, and request type message mail box means for storing the second client messages classified in the message receiving and classifying means as a request type and causing the operation of the task executing means.

In the above configuration, the number of processors in the multi-processor real time system is not limited to three. That is, a large number of processors are provided in the multi-processor real time system. Also, each of the processors is arbitrarily functions as a client or server. Therefore, in cases where a processor P1 functions as a client, the task executing means T1 of the processor P1 functions as a client executing means. In this case, a plurality of first client messages are send from the task executing means T1 to one or more other processors Ps functioning as servers. Thereafter, the first client messages are received and classified in the message receiving and classifying means of the processors Ps as a request type. Thereafter, the first client messages are stored in the request type message mail box means of the processors Ps, and the operation of the task executing means Ts of the processors Ps is caused each time a first client message is stored in the mail box means. Therefore, the first client messages are sent to the task executing means Ts, and a plurality of first services are performed. Thereafter, a plurality of first server messages sequentially generated in the task executing means Ts are sent to the message receiving and classifying means of the processor P1 through the inter-processor communication means and are classified as a response type. Thereafter, the first server messages are stored in the response type message mail box means of the processor P1, and the operation of the task executing means T1 of the processor P1 is caused each time a first server message is stored in the mail box means. Therefore, the first server messages are sequentially sent to the task executing means T1 and are processed.

Also, in cases where a processor P2 functions as a server, the task executing means T2 of the processor P2 functions as a server executing means. In this case, one or more second client messages is sent from the task executing means Tc of another processor Pc functioning as a client to the message receiving and classifying means of the processor P2 through the inter-processor communication means and are classified as a request type. Thereafter, the second client messages are stored in the request type message mail box means of the processor P2, and the operation of the task executing means T2 of the processor P2 is caused each time a second client message is stored in the mail box means. Therefore, the second client messages are sequentially sent to the task executing means T2 and a plurality of second services are processed. Thereafter, a plurality of second server messages generated in the task executing means P2 are send to the processor Pc. Thereafter, the second server messages are received and classified in the message receiving and classifying means of the processor Pc as a response type. Thereafter, the second server messages are stored in the response type message mail box means of the processor Pc, and the operation of the task executing means Tc of the processor Pc is caused each time a second server message is stored in the mail box means. Therefore, the second server messages are sent to the task executing means Tc and are processed.

Accordingly, because a large number of processors are provided in the multi-processor real time system and because each of the processors is arbitrarily functions as a client or server, a large number of services can be processed, and the performance of the service processing can be moreover enhanced in the multi-processor real time system.

BRIEF DESCRIPTION OF THE DRAWINGS

The objects, features and advantages of the present invention will be apparent from the following description taken in conjunction with the accompanying drawings, in which.

DETAIL DESCRIPTION OF THE PREFERRED EMBODIMENTS

Preferred embodiments of an inter-processor communication system according to the present invention are described with reference to drawings.

Figure 1:
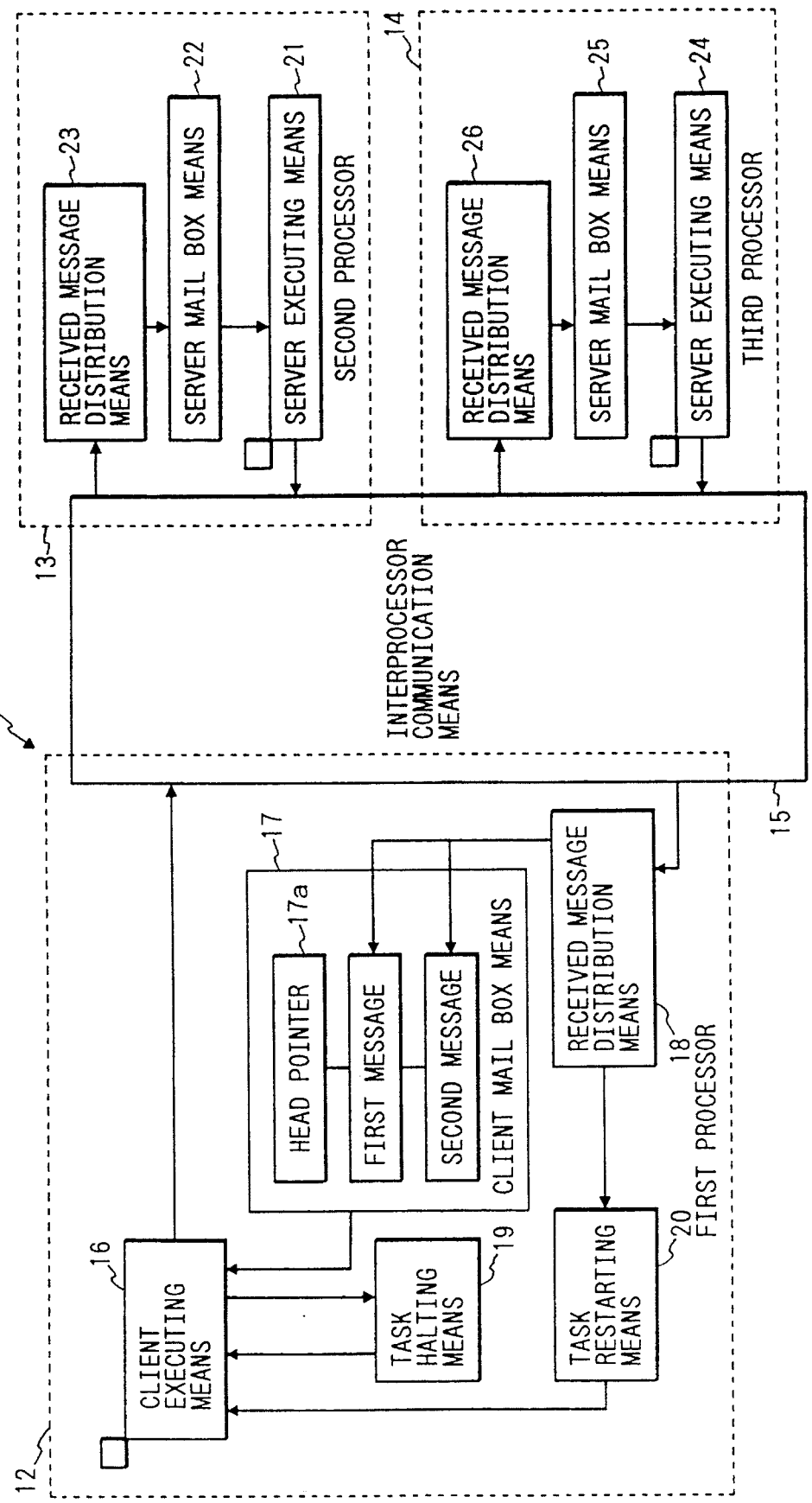
FIG. 1 is a functional block diagram of a conventional multi-processor real time system in which a request and response type procedure is performed among three processors according to a conventional inter-processor communication method.
Figure 2:
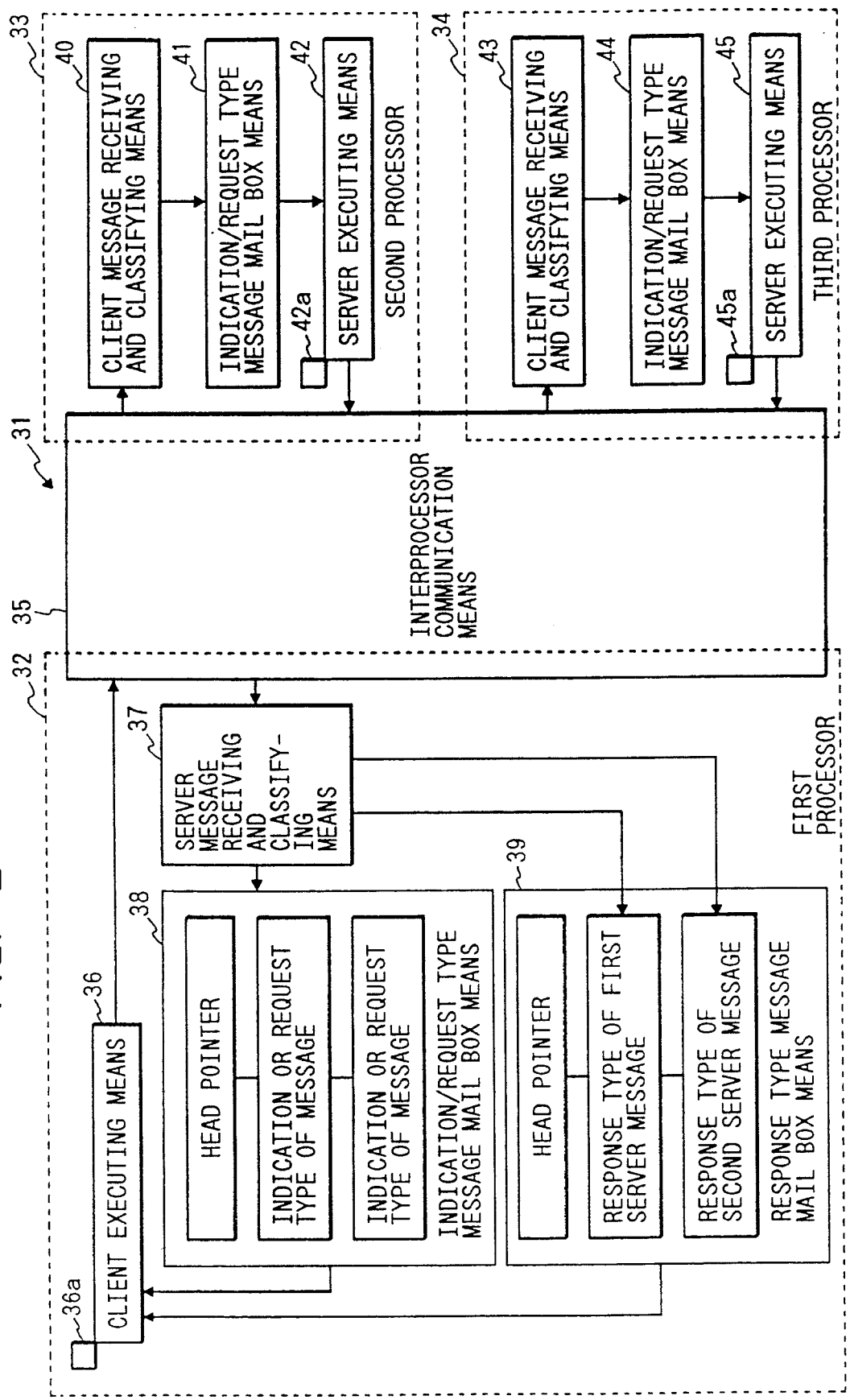
FIG. 2 is a functional block diagram of a multi-processor real time system according to a first embodiment of the present invention in which a request and response type procedure is performed among three processors according to an inter-processor communication method.

FIG. 2 is a functional block diagram of a multi-processor real time system according to a first embodiment of the present invention in which a request and response type procedure is performed among three processors according to an inter-processor communication method.

As shown in FIG. 2, a multi-processor real time system 31 comprises a first processor 32 functioning as a first task executing means to execute a large scale processing program of a client, a second processor 33 functioning as a second task executing means to execute a small scale processing program of a first server, a third processor 34 functioning as a third task executing means to execute another small scale processing program of a second server, and an inter-processor communication means 35 through which various types of messages such as an indication type of message, a request type of message and a response type of message are sent to perform a message communication among the processors 32, 33 and 34.

The first processor 32 comprises a client executing means 36 for sending a plurality of client messages to the second or third processor 33 or 34 in sequence to request a plurality of event processing services of the processor 33 or 34 and executing the client as the first task executing means to process a plurality of server messages sent from the second or third processor 33 or 34 in sequence, a server message receiving and classifying means 37 for selectively receiving the server messages addressed to the client executing means 36 of the first processor 32 in sequence and classifying each of the server messages as an indication type of message, a request type of message or a response type of message, an indication/request type message mail box means 38 for sequentially storing the server messages classified as the indication type of message or the request type of message in the server message receiving and classifying means 37 and causing the operation of the executing means 36 to send the server messages to the client executing means 36 in sequence, and a response type message mail box means 39 for sequentially receiving the server messages classified as the response type of message in the server message receiving and classifying means 37 and causing the operation of the client executing means 36 to send the server mesages to the client executing means 36 in sequence.

The second processor 33 comprises a client message receiving and classifying means 40 for selectively receiving one or more client messages addressed to the second processor 33 from the client executing means 36 of the first processor 32 in sequence and classifying each of the client message as an indication type of message or a request type of message, an indication/request type message mail box means 41 for sequentially storing the client messages classified in the client message receiving and classifying means 40, and a server executing means 42 for executing the first server as the second task executing means to perform one or more event processing services requested by the client executing means 36 according to the client messages sent from the indication/request type message mail box means 41 and generating the server messages denoting results of the event processing services.

The third processor 34 comprises a client message receiving and classifying means 43 for selectively receiving one or more client messages addressed to the third processor 34 from the client executing means 36 of the first processor 32 in sequence and classifying each of the client messages as an indication type of message or a request type of message. Also, the third processor 34 additionally comprises an indication/request type message mail box means 44 and a server executing means 45 in the same manner as the second processor 33.

An inter-processor communication system according to the present invention comprises the first processor 32, the second or third processor 33 or 34 and the inter-processor communication means 35.

In the above configuration of the multi-processor real time system 31, a request and response type inter-processor communication method in which the client executing means 36 sequentially requests a plurality of event processing services such as initialization processing services of the server executing means 42 or 45 is described in detail with reference to FIGS. 3 and 4.

Figure 3:
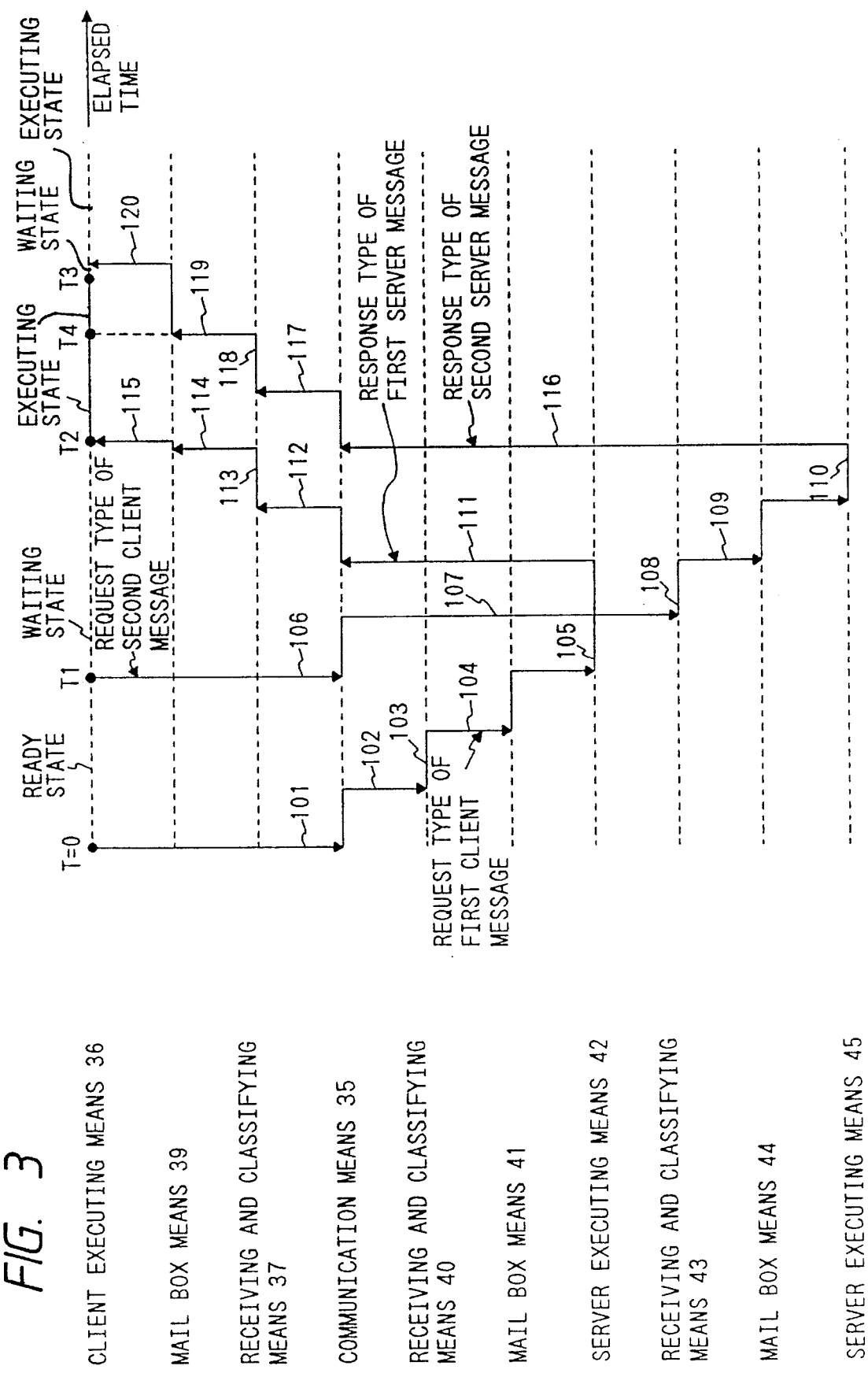
FIG. 3 shows the flow of a plurality of request type of messages and a plurality of response type of messages in the multi-processor real time system shown in FIG. 2.

FIG. 3 shows the flow of a plurality of request type of messages and a plurality of response type of messages in the multi-processor real time system 31. FIG. 4 shows a sending format of the client message utilized for the inter-processor communication.

In cases where it is judged in the client executing means 36 that a first event processing service for processing a first event is required of the server processing means 42 before the processing program of the client is executed in the client executing means 36, a request type of first client message is sent from the client executing means 36 to the inter-processor communication means 35 to request the first event processing service of the server processing means 42 (a flow 101), as shown in FIG. 3.

Figure 4:
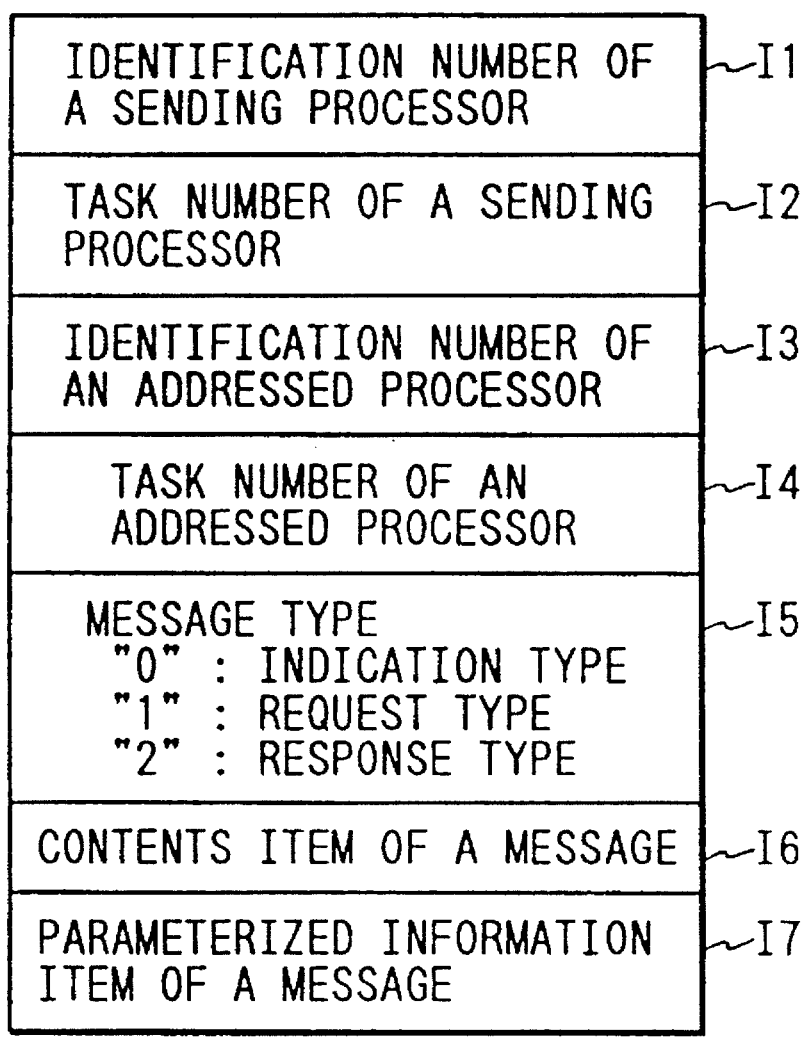
FIG. 4 shows a sending format of a client message utilized for an inter-processor communication in the multi-processor real time system shown in FIG. 2.

As shown in FIG. 4, a message is generally formed according to a sending format and is composed of various items such as an identification number I1 of a sending processor, a task number I2 of the sending processor, an identification number I3 of an addressed processor, a task number I4 of the addressed processor, a message type I5 such as an indication type ("0"), a request type ("1") or a response type ("2"), a contents item I6 of the message, and a parameterized information item I7 of the message. In general, when a request type of message is sent from the first processor 32 to the processor 33 or 34 through the communication means 35, a response type of message is returned to the first processor 32. Also, when an indication type of message is sent from the first processor 32 to the processor 33 or 34 through the communication means 35, no response type of message is returned to the first processor 32. In the first client message, the identification number I1 is set to the number "1" denoting the first processor 32, the task number I2 is set to the reference numeral "36" denoting the client executing means 36, the identification number I3 is set to the number "2" denoting the second processor 33, the task number I4 is set to the reference numeral "42" denoting the server executing means 42, the message type I5 is set to "1" denoting a request type, the contents of the first event processing service is written in the contents item I6, and pieces of parameterized information required to perform the first event processing service is written in the parameterized information I7.

Thereafter, the client executing means 36 is set in a ready state (a ready flag is set to "on", and a waiting flag is set to "off" in a flag 36a of the means 36) to receive a response type of message stored in the response type message mail box means 39. Also, the identification number I3 written in the first client message is read by the inter-processor communication means 35. Because the identification number I3 is set to the number "2" denoting the second processor 33, the first client message is sent to the second processor 33 (a flow 102). Also, the operation of the client message receiving and classifying means 40 is started by the function of the inter-processor communication means 35. That is, the task number I4 of the client message is checked, and it is judged in the means 40 that the first client message is addressed to the server executing means 42 (a flow 103). Also, the message type I5 of the client message is checked in the means 40, and it is judged in the means 40 that the first client message is a request type of message (the flow 103). Thereafter, the first client message is mailed at the indication/request type message mail box means 41 (a flow 104). At this time, because a flag 42a of the server executing means 42 is set in a ready state in which the means 42 is ready for the processing of an indication type of message or a request type of message mailed at the mail box means 41, the operation of the server executing means 42 is caused by the indication/request type message mail box means 41. That is, the operation of the server executing means 42 is immediately started. Therefore, the first event processing service requested by the client executing means 36 is performed in the server executing means 42 (a flow 105). For example, the current time is stored in an external storing device.

Also, during the processing of the first event in the means 42, it is judged in the client executing means 36 that a second event processing service for processing a second event is required of the server processing means 45 before the processing program of the client is executed in the client executing means 36. In this case, a request type of second client message is sent from the client executing means 36 to the inter-processor communication means 35 to request the second event processing service of the server processing means 45 (elapsed time T1, a flow 106). In the second client message, the identification number I1 is set to the number "1" denoting the first processor 32, the task number I2 is set to the reference numeral "36" denoting the client executing means 36, the identification number I3 is set to the number "3" denoting the third processor 34, the task number I4 is set to the reference numeral "45" denoting the server executing means 45, the message type I5 is set to "1" denoting a request type, the contents of the second event processing service is written in the contents item I6, and pieces of parameterized information required to perform the second event processing service is written in the parameterized information I7.

Thereafter, the client executing means 36 set in the ready state is reset in a waiting state (the ready flag is set to "off", and the waiting flag is set to "on" in the flag 36a of the means 36) to receive two response type of messages stored in the response type message mail box means 39 in sequence. Also, the identification number I3 written in the second client message is read by the inter-processor communication means 35. Because the identification number I3 is set to the number "3" denoting the third processor 34, the second client message is sent to the third processor 34 (a flow 107). Also, the operation of the client message receiving and classifying means 43 is started by the function of the inter-processor communication means 35. That is, the task number I4 of the client message is checked, and it is judged in the means 43 that the second client message is addressed to the server executing means 45 (a flow 108). Also, the message type I5 of the client message is checked in the means 43, and it is judged in the means 43 that the second client message is a request type of message (the flow 108). Thereafter, the second client message is mailed at the indication/request type message mail box means 44 (a flow 109). At this time, because a flag 45a of the server executing means 45 is set in a ready state in which the means 45 is ready for the processing of an indication type of message or a request type of message mailed at the mail box means 44, the operation of the server executing means 45 is caused by the mail box means 44. That is, the operation of the server executing means 45 is immediately started. Therefore, the second event processing service requested by the client executing means 36 is performed in the server executing means 45 (a flow 110). For example, a printer is operated to print out the current time.

When the first event processing service is completed in the server executing means 42, a response type of first server message is generated in the means 42 because the message type I5 of the first client message is set to "1". In the first server message, the identification number I1 is set to the number "2" denoting the second processor 33, the task number I2 is set to the reference numeral "42" denoting the server executing means 42, the identification number I3 is set to the number "1" denoting the first processor 32, the task number I4 is set to the reference numeral "36" denoting the client executing means 36, the message type I5 is set to "2" denoting a response type, the contents of the first event processing service is written in the contents item I6, and pieces of parameterized information required for the first event processing service is written in the parameterized information I7.

Thereafter, the first server message is sent to the inter-processor communication means 35 to inform the client executing means 36 of a result of the first event processing service (a flow 111), and the identification number I3 written in the first server message is read by the means 35. Because the identification number I3 is set to the number "1" denoting the first processor 32, the first server message is sent to the first processor 32 and is received in the server message receiving and classifying means 37 (a flow 112). In the means 37, it is confirmed that the message type I5 of the first server message is set to "2" (a flow 113), so that the first server message is mailed at the response type message mail box means 39 (a flow 114). In this case, because no server message is stored in the means 39, the first server message is stored in a first task queue placed at a top line of the means 39. In contrast, in cases where one or more other server messages has been already stored in the means 39, the first server message is stored in a subsequent task queue placed at a last line to read out the first server message after the other server messages are read out.

Because the client executing means 36 is set in the waiting state, the operation of the means 36 is caused by the mail box means 39 when the first server message is stored in the first task queue of the means 39. That is, the client executing means 36 is set in an executing state (the ready flag is set to "off", and the waiting flag is set to "off" in the flag 36a of the means 36). Therefore, the first server message is immediately sent to the client executing means 36 (elaspsed time T2, a flow 115). For example, the storage of the current time in the external storing device is informed the client. Thereafter, the first server message is processed in the client executing means 36 to execute the processing program of the client in the means 36 (from the elapsed time T2 to T3). Thereafter, because another response type of server message is not received in the client executing means 36, the client executing means 36 set in the executing state is again set in the waiting state to receive another response type of server message mailed at the mail box means 39.

In the same manner as the first server message, a response type of second server message is generated in the server executing means 45 when the second event processing service is completed in the means 45. Thereafter, the second server message is mailed at the response type message mail box means 39 (flows 116 to 119). In this case, even though the processing of the first server message is not completed in the means 36, the second server message is mailed at the means 39 (elapsed time T4). In other words, even though the second server message cannot be immediately sent from the means 39 to the client executing means 36, the second server message is stored until the processing of the first server message is completed in the means 36 at the elapsed time T3. Therefore, the second server message is necessarily mailed at the response type message mail box means 39. Thereafter, when the processing of the first server message is completed in the client executing means 36 on condition that the second server message is stored in the mail box means 39, the operation of the means 36 is caused by the mail box means 39 because the client executing means 36 is set in the waiting state. That is, the state of the client executing means 36 is changed to the executing state, and the operation of the means 36 is immediately restarted. Therefore, the second server message is immediately sent to the client executing means 36 when the processing of the first server message is completed in the client executing means 36 (a flow 120), and the processing of the second server message is performed in the means 36. For example, the operation of the printer is informed the client.

Also, an indication type of third server message or a request type of third server message is sent from the server executing means 42 or 45 to the first processor 32 through the inter-processor communication means 35. In this case, the third sever message is received and classified in the server message receiving and classifying means 37. Thereafter, the third server message is mailed at the indication/request type message mail box means 38. In cases where the client executing means 36 is set in the ready state or the waiting state, the third server message stored in the means 38 is not sent to the client executing means 36 because there is at least one response type of server message not sent to the client executing means 36. In other words, the receiving of a response type of server message in the client executing means 36 has priority over the receiving of an indication or request type of server message in the client executing means 36. Thereafter, when the client executing means 36 set in the ready state or the waiting state is reset to executing state because all of response type of messages responded to request type of client messages are sent from the mail box means 39 to the client executing means 36, the third server message stored in the means 38 is sent to the client executing means 36.

Accordingly, because the indication/request type message mail box means 38 and the response type message mail box means 39 are provided in place of the task halting means 19 and the task restarting means 20 conventionally utilized, a plurality of services can be sequentially completed in coaction of the first to third processors even though the services are requested of the second and third processors. That is, because the operation of the client executing means is caused each time a server message is stored in the response type message mail box means, even though a plurality of request type of client messages requesting a plurality of event processing services are sent to the processors 33, 34 in sequence, a plurality of response type of server messages informing of results of the event processing services can be reliably sent to the client executing means 36 in sequence, so that the server messages can be necessarily processed in the means 36 in sequence. That is, a plurality of events can be reliably processed in the servers of the multi-processor real time system 31 even though a plurality of services are requested of the servers in sequence according to a request and response type inter-processor communication method. Therefore, the performance of the service processing can be enhanced in the multi-processor real time system.

Also, even though an indication or request type of server message is stored in the mail box means 38 before all of response type of server messages are stored in the mail box means 39, all of the response type of server messages can be reliably sent to the client executing means 36 in sequence because the receiving of the response type of server messages in the client executing means 36 has priority over the receiving of the indication or request type of server message in the client executing means 36. Accordingly, the response type of server messages can be necessarily processed in the means 36 in sequence.

Also, because a plurality of services can be shared among a plurality of processors, a processing time of the services can be shortened. In other words, the performance of the service processing can be enhanced in the multi-processor real time system 31.

Figure 5:
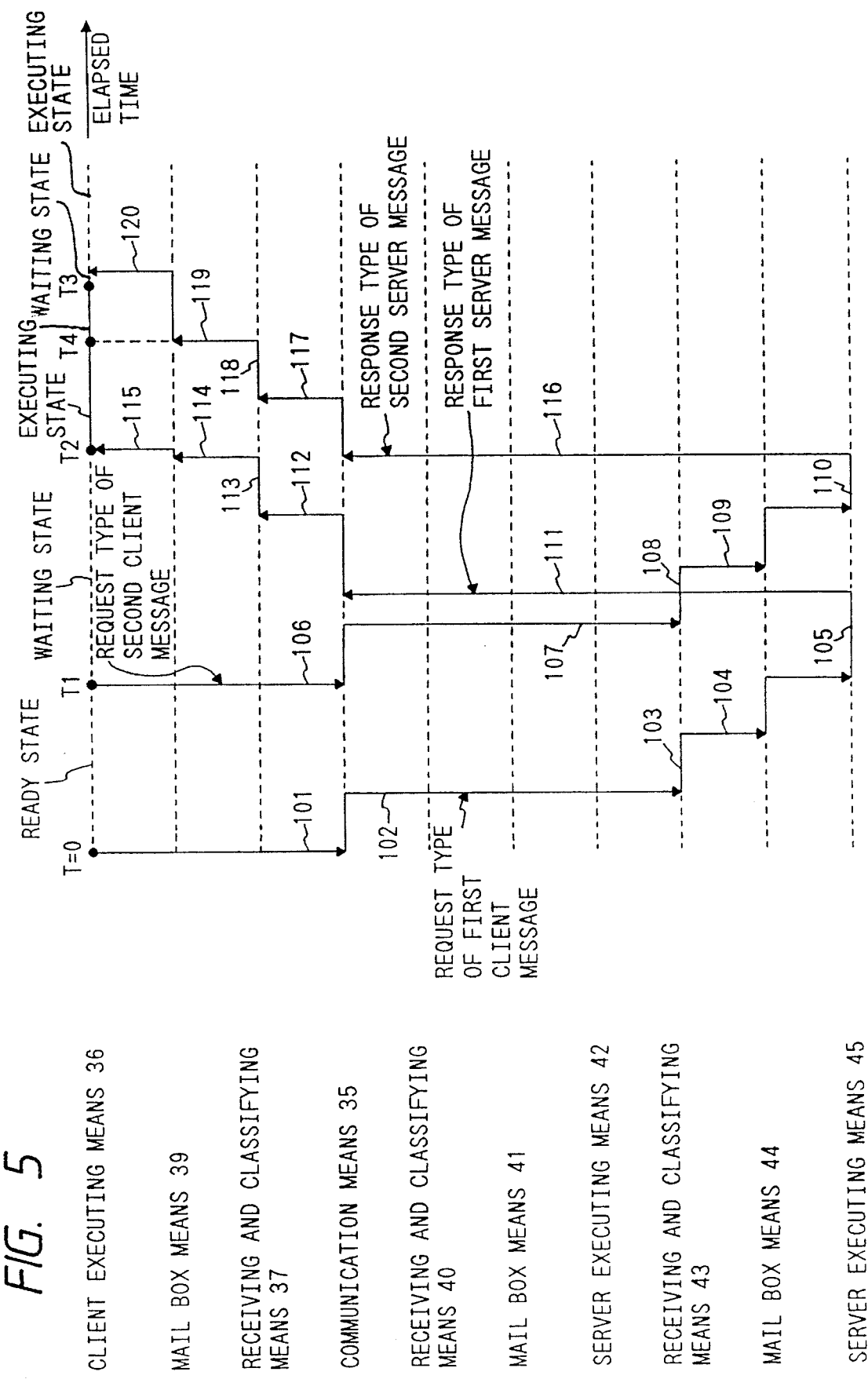
FIG. 5 shows the flow of a plurality of request type of messages and a plurality of response type of messages in an inter-processor communication system shown in FIG. 2.

In the above embodiment, the first client message is sent to the second processor 33 and the second client message is sent to the third processor 34. However, it is applicable that both the client messages are sent to the same processor 33 or 34. In this case, as shown in FIG. 5, the first and second server messages are sent from the processor 33 or 34 to the first processor 32. Therefore, even though a plurality of request type of client messages requesting a plurality of event processing services are sent to the same processor 33 or 34 in sequence, a plurality of response type of server messages informing of results of the event processing services can be reliably processed in the client executing means 36 in sequence. That is, a plurality of events can be reliably processed in a server of the inter-processor communication system even though a plurality of services are requested of the server in sequence according to a request and response type inter-processor communication method.

Figure 6:
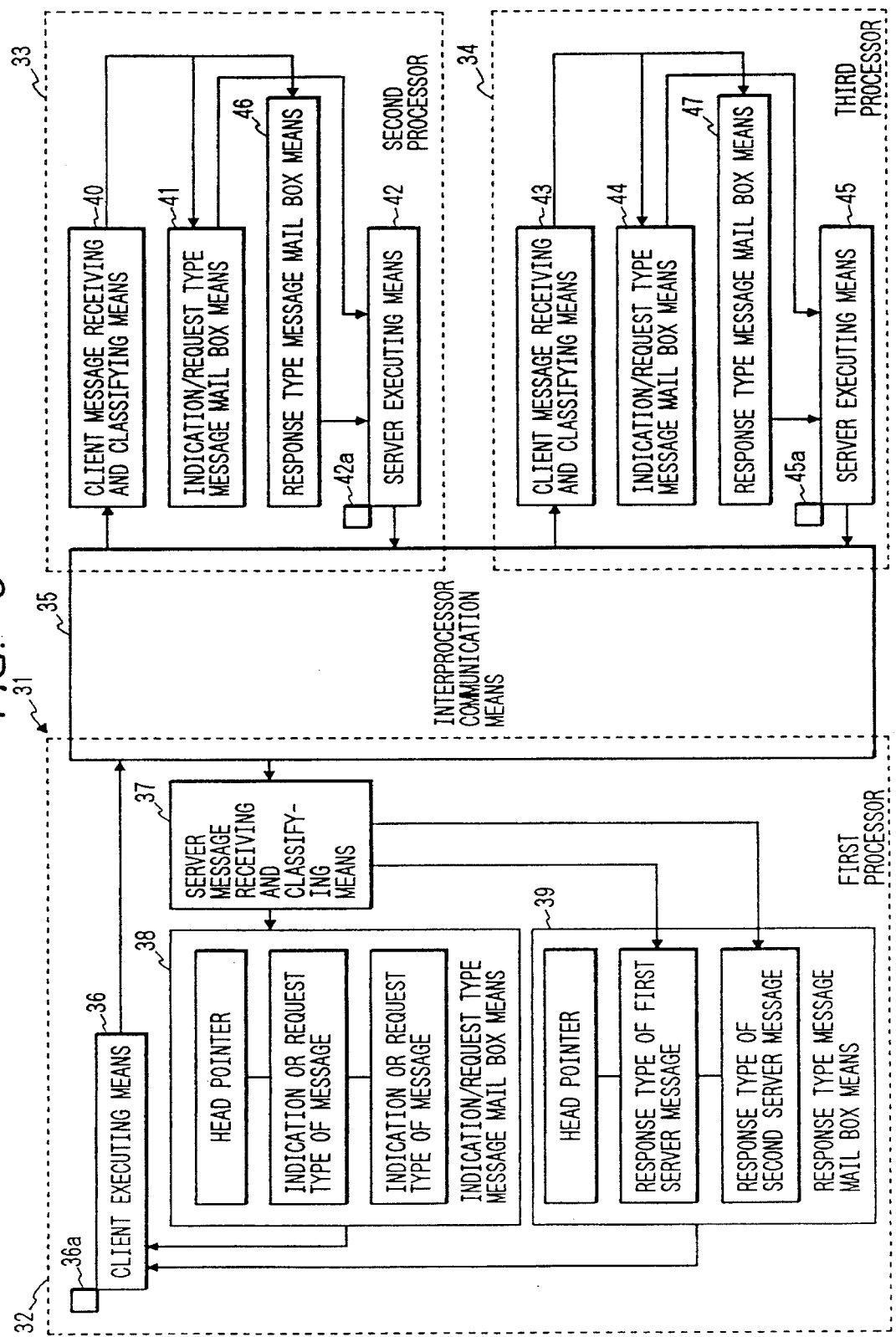
FIG. 6 is a functional block diagram of a multi-processor real time system according to an modification of the embodiment shown in FIG. 2.

Also, any response type message mail box means is not provided for the second processor 33 or the third processor 34. However, as shown in FIG. 6, it is applicable that a response type message mail box means 46 be additionally provided for the second processor 33 and another response type message mail box means 47 be additionally provided for the third processor 34. For example, an operating request is send from the client executing means 36 of the first processor 32 to an external storing device of the second processor 33, so that the operation of the external storing device is started. Thereafter, a response type of first server message is sent from the second processor 33 to the first processor 32 to inform of the operation of the external storing device. Thereafter, a time confirming request is sent from the second processor 33 to a clock of the third processor 34 and stored in the response type message mail box means 47. Thereafter, the time confirming request is sent to the server executing means 45, and a response type of second server message is sent from the third processor 34 to the second processor 33 to inform of the current time. Therefore, the current time is stored in the external storing device.

Accordingly, a request and response type communication can be performed among processors by the application of the inter-processor communication system in the multi-processor real time system 31.

Figure 7:
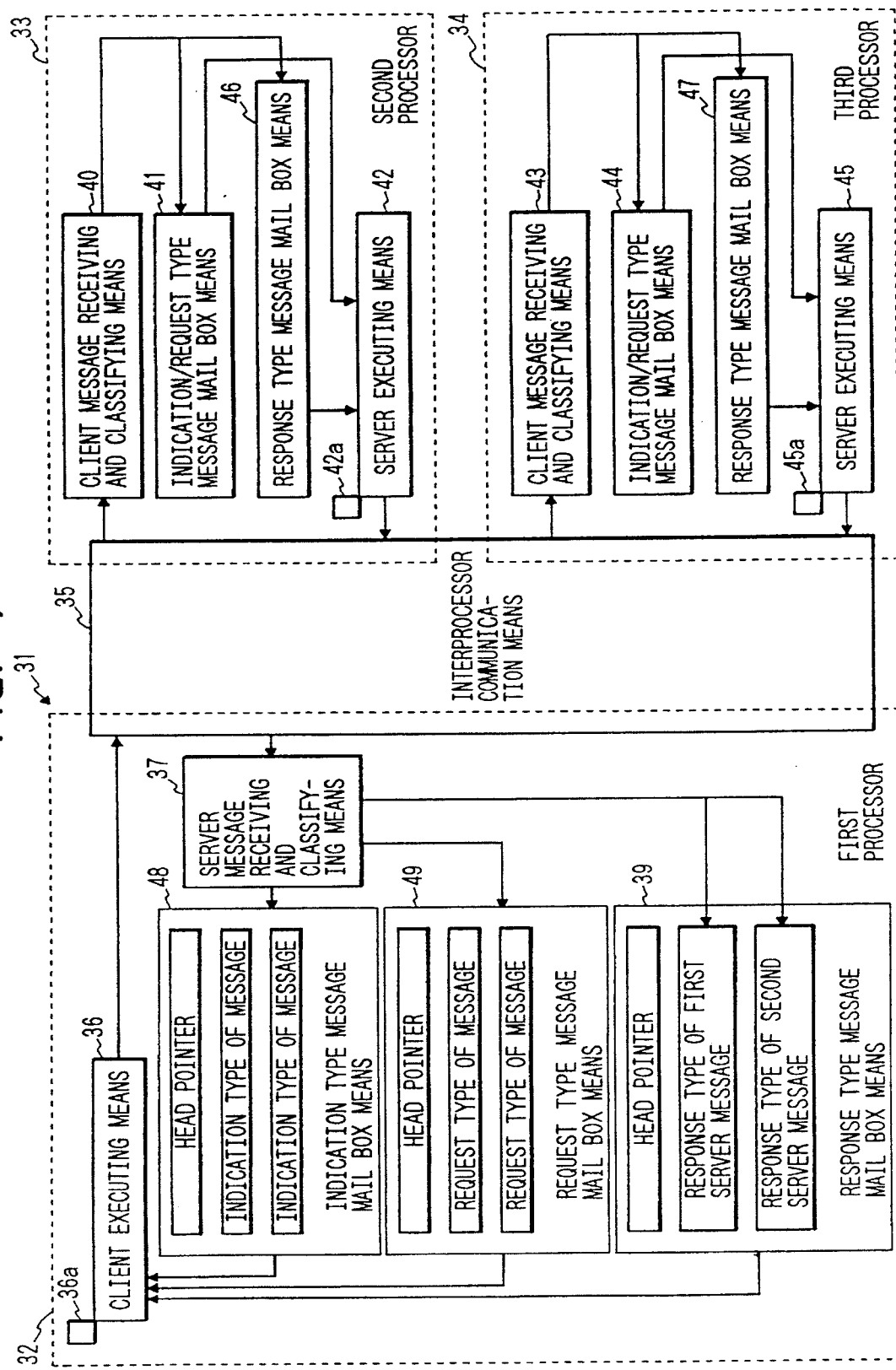
FIG. 7 is a functional block diagram of a multi-processor real time system according to another modification of the embodiment shown in FIG. 2.

Also, a message is stored in the indication/request type message mail box 38 in the above embodiment regardless of whether the message belongs to an indication type or a request type. However, as shown in FIG. 7, it is applicable that an indication type message mail box 48 and a request type message mail box 49 be independently provided for the first processor 32 in place of the indication/request type message mail box 38 to separately store an indication type of message and a request type of message and cause the operation of the client executing means 36. In this case, which type of message has priority to be processed in the client executing means 16 can be arbitrarily set.

Next, a multi-processor real time system according to a second embodiment of the present invention is described with reference to FIG. 8.

Figure 8:
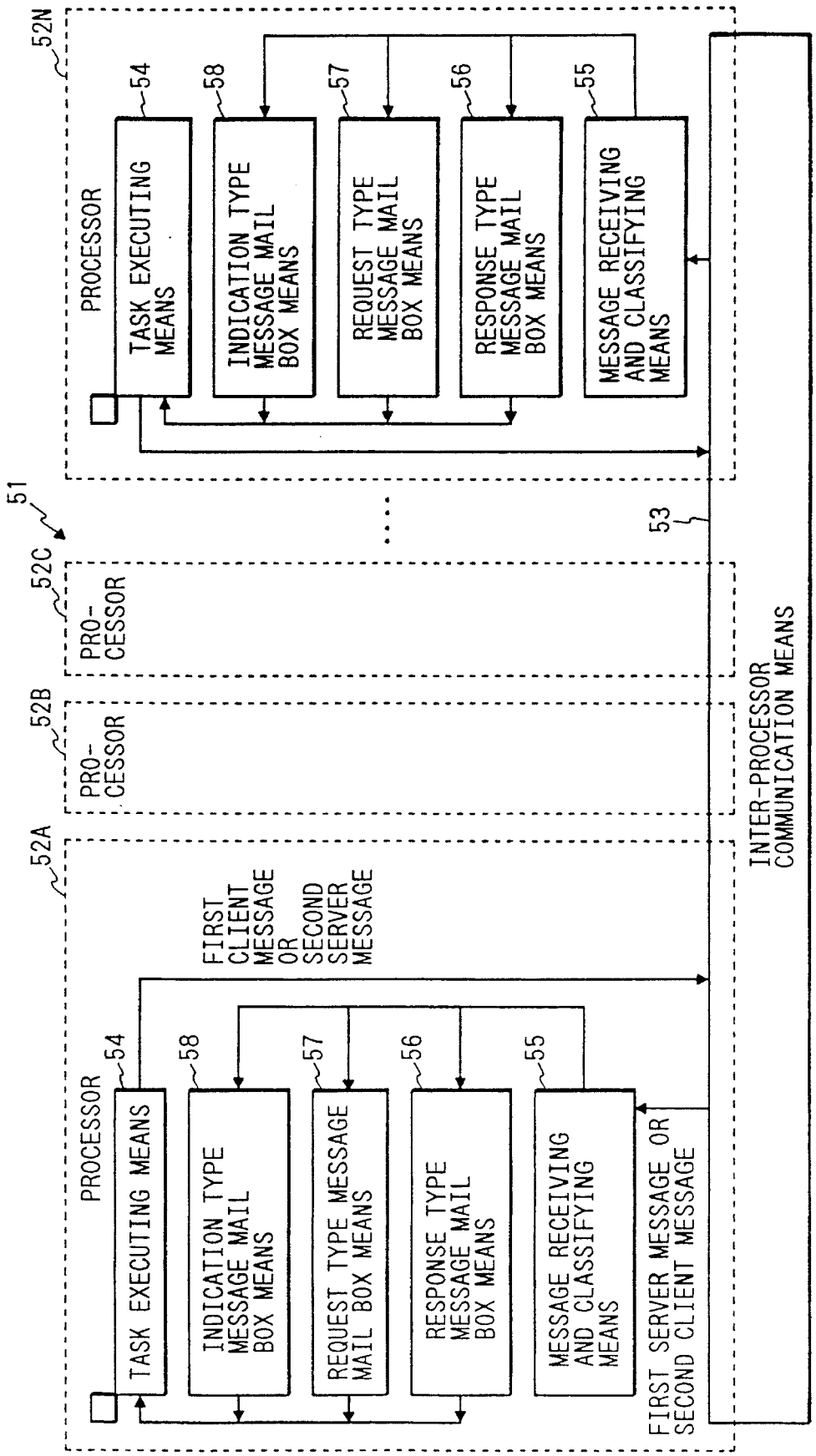
FIG. 8 is a functional block diagram of a multi-processor real time system according to a second embodiment.

FIG. 8 is a functional block diagram of a multi-processor real time system according to a second embodiment.

As shown in FIG. 8, a multi-processor real time system 51 comprises a plurality of processors 52A to 52N for sequentially processing a plurality of events in coaction of the processors, and an inter-processor communication means 53 for transferring various messages from one processor to another processor. Each of the processors arbitrarily functions as a client such as the first processor 32 or a server such as the second or third processor 33 or 34.

In detail, each of the processors comprises a task executing means 54 for sequentially sending a plurality of first request type of client messages to one or more other processors (Ps) functioning as servers to request first services for processing a plurality of first events, performing one or more second services requested by a processor (Pc) functioning as a client, generating one or more response type of second server messages which denote results of the second services requested by the processor (Pc) functioning as a client, and sending the second server messages to the processor (Pc) functioning as a client through the inter-processor communication means, a message receiving and classifying means 55 for receiving a plurality of response type of first server messages sent from the task executing means 54 of the processors (Ps) functioning as servers, classifying the first server messages as a response type, receiving one or more request type of second client messages sent from the task executing means 54 of the processor (Pc) functioning as a client, and classifying the second client messages as a request type, a response type message mail box means 56 for storing the first server messages classified in the message receiving and classifying means 55 as a response type and causing the operation of the task executing means 54, a request type message mail box means 57 for storing the second client messages classified in the message receiving and classifying means 55 as a request type and causing the operation of the task executing means 54, and an indication type message mail box means 58 for storing an indication type message which is generated in the task executing means 54 of another processor 52B and is classified as an indication type in the message receiving and classifying means 55.

In the above configuration, the number of processors 52A to 52N in the multi-processor real time system 51 is not limited to three. That is, a large number of processors 52A to 52N are provided in the multi-processor real time system 51. Also, each of the processors is arbitrarily functions as a client or server. Therefore, in cases where a processor 52A functions as a client, the task executing means 54 of the processor 52A functions as a client executing means. In this case, a plurality of first client messages are send from the task executing means 54 of the processor 52A to one or more other processors 52B, 52C functioning as servers. Thereafter, the first client messages are received and classified in the message receiving and classifying means 55 of the processors 52B, 52C as a request type. Thereafter, the first client messages are stored in the request type message mail box means 57 of the processors 52B, 52C, and the operation of the task executing means 54 of the processors 52B, 52C is caused each time a first client message is stored in the mail box means 57 of the processors 52B, 52C. Therefore, the first client messages are sent to the task executing means 54 of the processors 52B, 52C, and a plurality of first services are performed. Thereafter, a plurality of first server messages sequentially generated in the task executing means 54 of the processors 52B, 52C are sent to the message receiving and classifying means 55 of the processor 52A through the inter-processor communication means 53 and are classified as a response type. Thereafter, the first server messages are stored in the response type message mail box means 56 of the processor 52A, and the operation of the task executing means 54 of the processor 52A is caused each time a first server message is stored in the mail box means 56. Therefore, the first server messages are sequentially sent to the task executing means 54 of the processor 52A and are processed.

Also, in cases where the processor 52A functions as a server, the task executing means 54 of the processor 52A functions as a server executing means. In this case, one or more second client messages is sent from the task executing means 54 of another processor 52N functioning as a client to the message receiving and classifying means 55 of the processor 52A through the inter-processor communication means 53 and are classified as a request type. Thereafter, the second client messages are stored in the request type message mail box means 57 of the processor 52A, and the operation of the task executing means 54 of the processor 52A is caused each time a second client message is stored in the mail box means 57. Therefore, the second client messages are sequentially sent to the task executing means 54 of the processor 52A and a plurality of second services are processed. Thereafter, a plurality of second server messages generated in the task executing means 52A are send to the processor 52N. Thereafter, the second server messages are received and classified in the message receiving and classifying means 55 of the processor 52N as a response type. Thereafter, the second server messages are stored in the response type message mail box means 56 of the processor 52N, and the operation of the task executing means 54 of the processor 52N is caused each time a second server message is stored in the mail box means 56. Therefore, the second server messages are sent to the task executing means 54 of the processor 52N and are processed.

Also, in cases where an indication type message is generated in the task executing means 54 of the processor 52B, the indication type message is sent to the processor 52A. Thereafter, the indication type message is classified as an indication type in the message receiving and classifying means 55 and is stored in the indication type message mail box means 58. Thereafter, the indication type message is read out to the task executing means 54 to process the indication type message after the response type of first server messages are read out to the client executing means 54.

Accordingly, because a large number of processors 52A to 52N are provided in the multi-processor real time system 51 and because each of the processors is arbitrarily functions as a client or server, a large number of services can be processed, and the performance of the service processing can be moreover enhanced in the multi-processor real time system 51.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An inter-processor communication system for processing a plurality of events in parallel with a first processor and a second processor, comprising:

client executing means placed in the first processor for sequentially sending a request type of a first client message and a request type of a second client message following the first client message to the second processor to request a first service and a second service for processing a first event and a second event and waiting for the first and second services sent from the second processor without sending any request type of a client message any more, the second client message being sent to the second processor regardless of whether the first service relating to the first client message is received from the second processor to the client executing means;

client message receiving and classifying means placed in the second processor for sequentially receiving the first and second client messages sent from the client executing means and classifying the first and second client messages as a request type;

request type message mail box means placed in the second processor for sequentially storing the first and second client messages classified in the client message receiving and classifying means;

server executing means placed in the second processor for performing the first and second services requested by the client executing means in sequence according to the first and second client messages stored in the request type message mail box means and sequentially generating a response type of first server message denoting a result of the first service and a response type of second server message denoting a result of the second service;

inter-processor communication means placed between the first and second processors for performing a first message communication in which the first and second client messages are sent from the client executing means to the client message receiving and classifying means and a second message communication in which the first and second server messages are sent from the server executing means to the first processor;

server message receiving and classifying means placed in the first processor for sequentially receiving the first and second server messages sent from the server executing means through the inter-processor communication means and classifying the first and second server messages as a response type; and response type message mail box means placed in the first processor for sequentially storing the first server and the second server message following the first server message which are classified in the server message receiving and classifying means, wherein the second server message is stored in the response type message mail box means regardless of whether the processing of the first event executed in the client executing means in response to the storage of the first server message is finished, and the second event in response to the storage of the second server message in the response type message mail box means is executed in the client executing means in cases where the processing of the first event is finished.

2. An inter-processor communication system according to claim 1, further comprising:

indication/request type message mail box means placed in the first processor for storing an indication type message or a request type message which is generated in the server executing means independent of the first and second client messages and is classified as an indication type or a request type in the server message receiving and classifying means, wherein the client executing means is responsive to the storage of the indication type message or a request type message in the indication/request type message mail box means to cause the processing of the indication type message or the request type message by the client executing means after the response type of first and second server messages have been processed by the client executing means.

3. An inter-processor communication system according to claim 2, wherein the indication/request type message mail box means comprises an indication type message mail box means for storing the indication type message and a request type message mail box means for storing the request type message, and wherein the indication type message mail box means and the request type message mail box means are provided independent from one another.

4. A multi-processor real time system for processing a plurality of events in parallel with a first processor, a second processor and a third processor, comprising:

client executing means placed in the first processor for sequentially sending a first client message to the second processor to request a first service for processing a first event and a second client message to the third processor to request a second service for processing a second event and waiting for the first and second services sent from the second and third processors without sending any request type of a client message any more;

first client message receiving and classifying means placed in the second processor for receiving the first client message sent from the client executing means and classifying the first client message as a request type;

first request type message mail box means placed in the second processor for storing the first client message classified in the first client message receiving and classifying means;

first server executing means placed in the second processor for performing the first service requested by the client executing means according to the first client message stored in the first request type message mail box means and generating a first server message which denotes a result of the first service;

second client message receiving and classifying means placed in the third processor for receiving the second client message sent from the client executing means and classifying the second client message as a request type;

second request type message mail box means placed in the third processor for storing the second client message classified in the second client message receiving and classifying means;

second server executing means placed in the third processor for performing the second service requested by the client executing means according to the second client message stored in the second request type message mail box means and generating a second server message which denotes a result of the second service;

inter-processor communication means for performing a first message communication in which the first client message and the first server message are transferred between the first and second processors and a second message communication in which the second client message and the second server message are transferred between the first and third processors;

server message receiving and classifying means placed in the first processor for sequentially receiving the first server message sent from the first server executing means and the second server message sent from the second server executing means through the inter-processor communication means and classifying the first and second server messages as a response type; and response type message mail box means placed in the first processor for sequentially storing the first server message and the second server message following the first server message which are classified in the server message receiving and classifying means, the second server message is stored in the response type message mail box means regardless of whether the processing of the first event executed in the client executing means in response to the storage of the first server message is finished, and the second event in response to the storage of the second server message is executed in the client executing means in cases where the processing of the first event is finished in the client executing means.

5. A multi-processor real time system according to claim 4, further comprising:

indication/request type message mail box means placed in the first processor for storing an indication type message or a request type message which is generated in the first server executing means or the second server executing means independent of the first client message and the second client message and is classified as an indication type or a request type in the server message receiving and classifying means, wherein the client executing means is responsive to the storage of the indication type message or the request type message in the indication/request type message mail box means to cause the processing of the indication type message or the request type message by the client executing means after the first and second server messages have been processed by the client executing means.

6. A multi-processor real time system according to claim 5, wherein the indication/request type message mail box means comprises an indication type message mail box means for storing the indication type message and a request type message mail box means for storing the request type message and wherein the indication type message mail box means and the request type message mail box means are provided independent from each another.

7. A multi-processor real time system, comprising a plurality of processors for sequentially processing a plurality of events in parallel; and an inter-processor communication means for transferring various messages from one processor to another processor, each of the processors comprising task executing means for sequentially sending a plurality of request type of client messages to one or more other processors Ps functioning as servers to request first services for processing a plurality of events and waiting for the first services sent from the processors Ps without sending any request type of a client message any more, performing one or more second services requested by a processor Pc functioning as a client, generating one or more response type of server messages which denote results of the second services requested by the processor Pc functioning as a client, and sending the server messages to the processor Pc functioning as a client through the inter-processor communication means, message receiving and classifying means for receiving a response type of first server message and the response type of second server messages sent from the task executing means of the processors Ps functioning as servers, classifying the first and second server messages as a response type, receiving one or more request type of client messages sent from the task executing means of the processor Pc functioning as a client, and classifying the client messages as a request type, response type message mail box means for storing the first server message and the second server messages following the first server message which are classified in the message receiving and classifying means as a response type, wherein the task executing means is responsive to the storage of the first and second server messages in the response type message mail box means to cause the first and second server messages to be sequentially read out from the response type message mail box means and processed by the task executing means, the second server messages are stored in the response type message mail box means regardless of whether the processing of a first event executed in the task executing means in response to the storage of the first server message is finished, and second events in response to the storage of the second server messages are sequentially executed in the task executing means in cases where the processing of the first event is finished in the task executing means, and request type message mail box means for storing the client messages classified in the message receiving and classifying means as a request type, wherein services requested by the client messages are executed in the task executing means in response to the storage of the client message in the request type message mail box means.

8. A multi-processor real time system according to claim 7, additionally including:

indication type message mail box means placed in each of the processors for storing an indication type message which is generated in the task executing means of another processor and is classified as an indication type in the message receiving and classifying means, the indication type message stored in the indication type message mail box means being read out to the task executing means to process the indication type message after the first and second server messages are read out from the response type message mail box means and the first and second events are executed in the task executing means.

* * * * *